March 21, 1950      A. R. PATRICK      2,501,139

HYDRAULIC LOCK

Filed Oct. 26, 1945

INVENTOR.
Audie Ross Patrick
BY
ATTORNEY

Patented Mar. 21, 1950

2,501,139

UNITED STATES PATENT OFFICE 2,501,139

HYDRAULIC LOCK

Audie Ross Patrick, Kansas City, Mo.

Application October 26, 1945, Serial No. 624,859

1 Claim. (Cl. 251—132)

This invention relates to hydraulic locks of the character adapted for positioning in the flow line of an hydraulic system, and the primary aim is to provide simple, effective and positively acting means for preventing the back flow of fluid in the system and to lock fluid in that portion of the system to one side of the means, which has structure for releasing the lock to permit movement of the fluid in the system in either direction.

A further aim of the invention is to provide a lock of the aforementioned character, wherein the releasing structure is manually operable and capable of shifting to and from an effective position without danger of causing the component elements of the lock to become maladjusted.

Structural features of the hydraulic lock are important and other objects of the invention pertaining thereto will appear during the course of the following specification, referring to the accompanying drawing, wherein.

Figure 1:
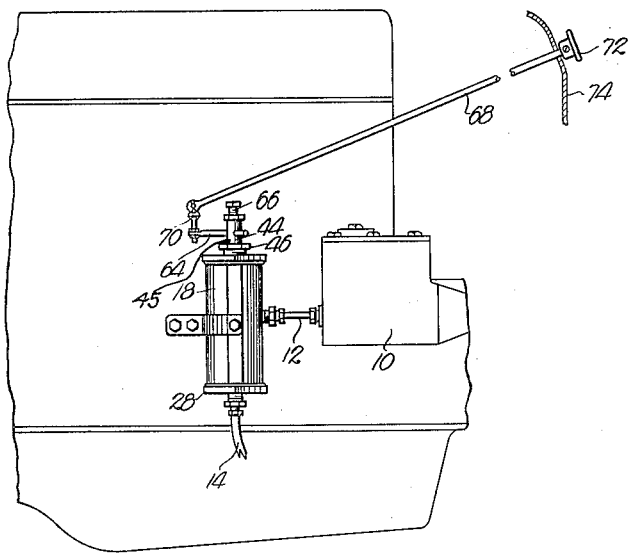
Fig. 1 is a side elevational view of an hydraulic lock made in accordance with the present invention and associated with the hydraulic braking system of an automobile.

The lock is positioned in the flow line of an hydraulic system and in the instance illustrated, the automobile has a master cylinder 10 from which conduit 12 receives fluid under pressure when the brake pedal of the automobile is depressed.

When the hydraulic lock, as contemplated by this invention is installed, it receives fluid from conduit 12 and as the fluid passes through conduit 14 to the work, a valve member 16 within body 18 is forced from its position on seat 20 where it is normally held by the influence of spring 22.

Seat 20 is made of resilient material and held in operative position by snap ring 24 engaged within an annular groove of body 18. A passage 26 extends through body 18 from one end thereof to the other, and this passage is contoured as clearly illustrated in Fig. 2, to allow for the introduction of plug 28 that is in screw-threaded engagement with body 18 at one end thereof. It is this plug 28 that holds spring 22 in position against one end of valve member 16.

Plug 28 has an opening 30 in communication with conduit 14 and when valve member 16 is lifted from its seat, fluid under pressure is free to flow through passage 26 from inlet port 32 to the outlet port, which is formed by opening 30.

Valve member 16 is designed to allow expansion and contraction of the fluid locked within that portion of the system to one side of the body and which includes conduit 14. If, for example, the oil or other fluid is locked in the system or in conduit 14 and friction or other action increases the temperature, the fluid may expand into chamber 34 provided in valve 16 but held normally closed by ball 36 which closes bore 38.

A spring 40 yieldably maintains ball 36 in a place where bore 38 is closed, and since chamber 34 is in connection with passage 26 through bleeder opening 42, any fluid that may force its way into chamber 34 will enter that portion of passage 26 and thence the part of the system wherein fluid under pressure is not locked under pressure. In other words, there is always a lower pressure in that part of passage 26 adjacent to bleeder opening 42 when valve member 16 is functioning than the pressure in conduit 14 and the adjacent part of passage 26.

Figure 2:
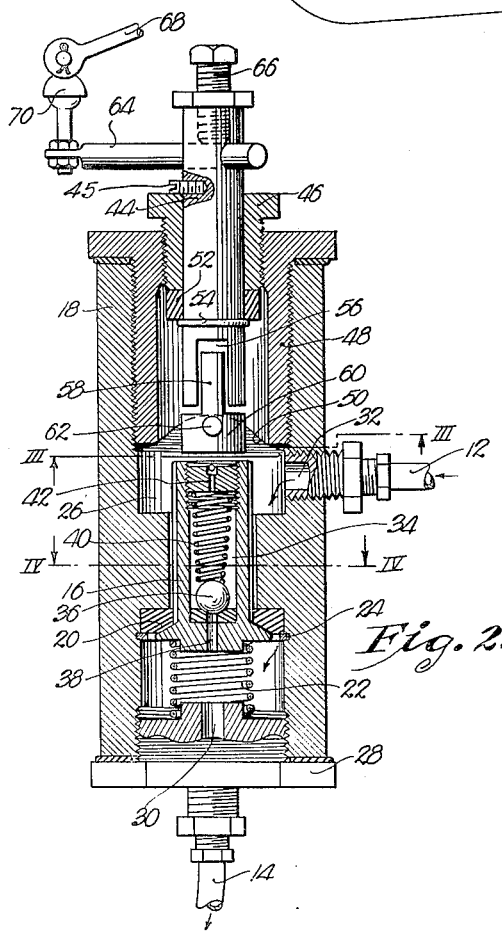
Fig. 2 is a longitudinal central sectional view through the lock.
Figure 3:
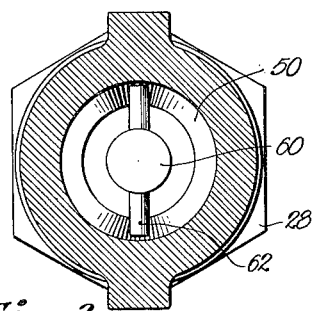
Fig. 3 is a transverse cross sectional view taken on line III—III of Fig. 2.
Figure 4:
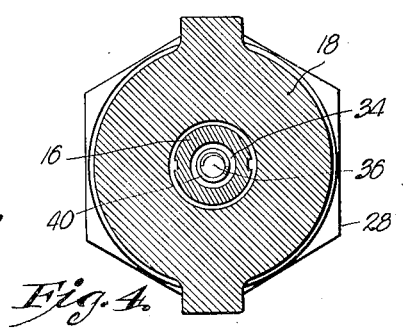
Fig. 4 is another cross sectional view taken on line IV—IV of Fig. 2.

To maintain the lock in a position where the fluid may flow to and fro as it is put to work, valve member 16 is held out of its position upon seat 20. The movement of this valve 16 into a place where the fluid may flow with equal ease in either direction, must be accomplished without injury to the parts of the lock and without danger of binding the same. Accordingly, control shaft 44 is rotatably mounted in body 18 by plug 46 that is in screw-threaded engagement with a sleeve 48 threadingly mounted within passage 26 of body 18. This sleeve 48 is directed inwardly, as illustrated in Fig. 2, and has a cam face 50 developed on the inner end thereof. Plug 46 journals shaft 44 and leakage therearound is prevented by packing 52 held in place by ring 54. A set screw 45 on the shaft 44 overlies the plug 46 for limiting downward movement of the shaft 44 into sleeve 48.

A socket 56 formed in shaft 44 is polygonal in cross section and receives a neck 58 on anvil 60. This anvil has a cross pin 62 therethrough to bear upon cam face 50. The pressure of fluid in the system maintains pin 62 against cam face 50 and as shaft 44 is turned about its axis, anvil 60 moves longitudinally toward and from the adjacent end of valve member 16. When the innermost portion of cam face 50 is against pin 62, valve 16 is moved from its place on seat 20 and no locking of the fluid in one portion of the system to one side of body 18 occurs.

Shaft 44 has an arm 64 adjustably mounted therein by set screw 66 and an actuating rod 68 attached to arm 64 by coupling 70 extends to a knob 72 on the instrument board 74 of the automobile. Thus, when the hydraulic lock is used in connection with the braking system of an automobile and it is desired to set the brakes, the brake pedal is depressed with the parts of the lock in the condition shown in Fig. 2. Fluid in conduit 14 and the conventional tubes joining that said conduit with the brake structure of the automobile wheels, will be maintained under full pressure and the brakes will be secured against release.

When it is desired to return the braking system to a condition of normal operation, actuating rod 68 is pulled to turn shaft 44 and move anvil 60 down against valve 16 to unseat the same, and therefore, establish an unrestricted passage 26 through body 18 from intake port 32 to outlet port 30. In such condition, the brakes are applied and released by movement of the brake pedal.

The utility of the hydraulic lock has been made clear by describing the same as usable with an automobile braking system, but it will be clear to those skilled in the art that the lock may be employed elsewhere with equal effectiveness.

Having thus described the invention, what is claimed as new and desired to be secured by Letters Patent is:

In a lock of the kind having a hollow body provided with an inlet port and an outlet port and adapted to be interposed within the flow line of an hydraulic system, said body having a valve member therewithin reciprocable to and from a position for blocking the passage of fluid through the body, said valve member being provided with means for yieldably holding the same biased in said position, improvement of which comprises actuating means for the valve member including a cam face formed within the body; a shaft journaled for rotation in the body in alignment with the valve member; and an anvil floatingly mounted in the body between said shaft and said valve member, said anvil being operably connected with the shaft for rotation thereby and being freely movable toward and away from the shaft on the rotative axis of the latter and having a radially extending cross pin bearing against said cam face, whereby as the shaft is rotated, reciprocable movement is imparted to the anvil and to said valve member.

AUDIE ROSS PATRICK.

REFERENCES CITED

The following references are of record in the file of this patent:

UNITED STATES PATENTS

| Number | Name | Date |
| --- | --- | --- |
| 1,374,860 | Miller | Apr. 12, 1921 |
| 1,627,486 | Cravens | May 3, 1927 |
| 2,310,485 | Wyckoff | Feb. 9, 1943 |
| 2,336,700 | Pepersack | Dec. 14, 1943 |